United States Patent
Amirsolaimani et al.

(10) Patent No.: US 11,933,975 B2
(45) Date of Patent: Mar. 19, 2024

(54) EYE TRACKING BASED ON WAVEGUIDE IMAGING

(71) Applicant: META PLATFORMS TECHNOLOGIES, LLC, Menlo Park, CA (US)

(72) Inventors: Babak Amirsolaimani, Redmond, WA (US); Pasi Saarikko, Kirkland, WA (US); Ying Geng, Bellevue, WA (US); Yusufu Njoni Bamaxam Sulai, Snohomish, WA (US); Scott Charles McEldowney, Redmond, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 221 days.

(21) Appl. No.: 17/677,406

(22) Filed: Feb. 22, 2022

(65) Prior Publication Data
US 2022/0179206 A1    Jun. 9, 2022

Related U.S. Application Data

(63) Continuation of application No. 16/359,117, filed on Mar. 20, 2019, now Pat. No. 11,256,086.
(Continued)

(51) Int. Cl.
*G02B 27/00* (2006.01)
*F21V 8/00* (2006.01)
(Continued)

(52) U.S. Cl.
CPC ....... *G02B 27/0093* (2013.01); *G02B 6/0056* (2013.01); *G02B 6/105* (2013.01);
(Continued)

(58) Field of Classification Search
CPC ...... G02B 2027/011; G02B 2027/0138; G02B 2027/0174; G02B 2027/0178;
(Continued)

(56) References Cited

U.S. PATENT DOCUMENTS 9,250,373 B2   2/2016   Kubota
9,377,623 B2   6/2016   Robbins et al.
(Continued)

FOREIGN PATENT DOCUMENTS

CN   104126143 A   10/2014
CN   107645921 A   1/2018
(Continued)

OTHER PUBLICATIONS

Bigler C.M., et al., "Holographic Waveguide Heads-Up Display for Longitudinal Image Magnification and Pupil Expansion," Mar. 20, 2018, vol. 57 (9), pp. 1-7.
(Continued)

*Primary Examiner* — Joseph P Martinez
*Assistant Examiner* — Vipin Patel
(74) *Attorney, Agent, or Firm* — Morgan, Lewis & Bockius LLP

(57) ABSTRACT

An optical system includes an optical waveguide, and a first optical element configured to direct a first ray, having a first circular polarization and impinging on the first optical element at a first incidence angle, in a first direction so that the first ray propagates through the optical waveguide via total internal reflection toward a second optical element. The first optical element is configured to also direct a second ray, having a second circular polarization that is distinct from the first circular polarization and impinging on the first optical element at the first incidence angle, in a second direction that is distinct from the first direction so that the second ray propagates away from the second optical element. The
(Continued)

second optical element is configured to direct the first ray propagating through the optical waveguide toward a detector.

20 Claims, 12 Drawing Sheets

Related U.S. Application Data

(60) Provisional application No. 62/804,136, filed on Feb. 11, 2019, provisional application No. 62/804,126, filed on Feb. 11, 2019, provisional application No. 62/673,805, filed on May 18, 2018.

(51) Int. Cl.
| | |
|---|---|
| *G02B 6/10* | (2006.01) |
| *G02B 6/27* | (2006.01) |
| *G02B 6/35* | (2006.01) |
| *G02B 6/42* | (2006.01) |
| *G02B 23/12* | (2006.01) |
| *G02B 27/01* | (2006.01) |
| *G06F 3/01* | (2006.01) |
| *G06T 7/70* | (2017.01) |

(52) U.S. Cl.
CPC ............ *G02B 6/27* (2013.01); *G02B 6/356* (2013.01); *G02B 6/42* (2013.01); *G02B 6/4206* (2013.01); *G02B 23/125* (2013.01); *G02B 27/0172* (2013.01); *G06F 3/013* (2013.01); *G06T 7/70* (2017.01); *G02B 2027/011* (2013.01); *G02B 2027/0138* (2013.01); *G02B 2027/0174* (2013.01); *G02B 2027/0178* (2013.01)

(58) Field of Classification Search
CPC .......... G02B 2027/0187; G02B 23/125; G02B 27/0093; G02B 27/0172; G02B 27/283; G02B 6/00; G02B 6/0056; G02B 6/105; G02B 6/27; G02B 6/356; G02B 6/42; G02B 6/4206; G06F 3/013; G06T 7/70
See application file for complete search history.

(56) References Cited

U.S. PATENT DOCUMENTS

| | | | |
|---|---|---|---|
| 2010/0134534 A1 | 6/2010 | Seesselberg et al. | |
| 2011/0292321 A1 | 12/2011 | Travis et al. | |
| 2012/0236030 A1 | 9/2012 | Border et al. | |
| 2013/0108229 A1 | 5/2013 | Starner et al. | |
| 2015/0289762 A1* | 10/2015 | Popovich ............. | G02B 6/4287 |
| | | | 351/209 |
| 2017/0039905 A1 | 2/2017 | Jepsen et al. | |
| 2017/0205618 A1 | 7/2017 | Basset et al. | |
| 2018/0113303 A1 | 4/2018 | Popovich et al. | |
| 2018/0120563 A1 | 5/2018 | Kollin et al. | |
| 2018/0203505 A1 | 7/2018 | Trail et al. | |
| 2019/0353898 A1 | 11/2019 | Amirsolaimani et al. | |
| 2019/0369719 A1 | 12/2019 | Klingstrom et al. | |
| 2021/0208405 A1 | 7/2021 | Topliss et al. | |

FOREIGN PATENT DOCUMENTS

| | | |
|---|---|---|
| EP | 3794396 A1 | 3/2021 |
| WO | 2017134412 A1 | 8/2017 |
| WO | 2020069026 A1 | 4/2020 |

OTHER PUBLICATIONS

Extended European Search Report for European Application No. 19803933.1, dated Jun. 30, 2021, 7 pages.
Hu X., et al., "Optical Design of an Eyetracked Head-Mounted Display Using Freeform Waveguide," Classical Optics, Jun. 2014, 3 Pages, Retrieved from the Internet: URL: https://www.researchgate.net/publication/263819328_Optical_Design_of_An_Eyetracked_Head-mounted_Display_using_Freeform_Waveguide.
International Preliminary Report Patentability for International Application No. PCT/US2019/028452, dated Dec. 3, 2020, 8 Pages.
International Search Report and Written Opinion for International Application No. PCT/US2019/028452, dated Aug. 30, 2019, 10 Pages.
Non-Final Office Action dated Sep. 15, 2021 for U.S. Appl. No. 16/535,794, filed Aug. 8, 2019, 15 Pages.
Non-Final Office Action dated Jun. 24, 2021 for U.S. Appl. No. 16/359,117, filed Mar. 20, 2019, 15 Pages.
Notice of Allowance dated Dec. 17, 2021 for U.S. Appl. No. 16/359,117, filed Mar. 20, 2019, 2 pages.
Notice of Allowance dated Oct. 18, 2021 for U.S. Appl. No. 16/359,117, filed Mar. 20, 2019, 8 pages.
Notice of Allowance dated Feb. 23, 2022 for U.S. Appl. No. 16/535,794, filed Aug. 8, 2019, 7 pages.
Notification of the First Office Action dated Jan. 12, 2022 for Chinese Application No. 201980033381.4, filed Apr. 22, 2019, 22 pages.
Non-Final Office Action dated Sep. 14, 2023 for U.S. Appl. No. 17/845,765, filed Jun. 21, 2022, 13 pages.

* cited by examiner

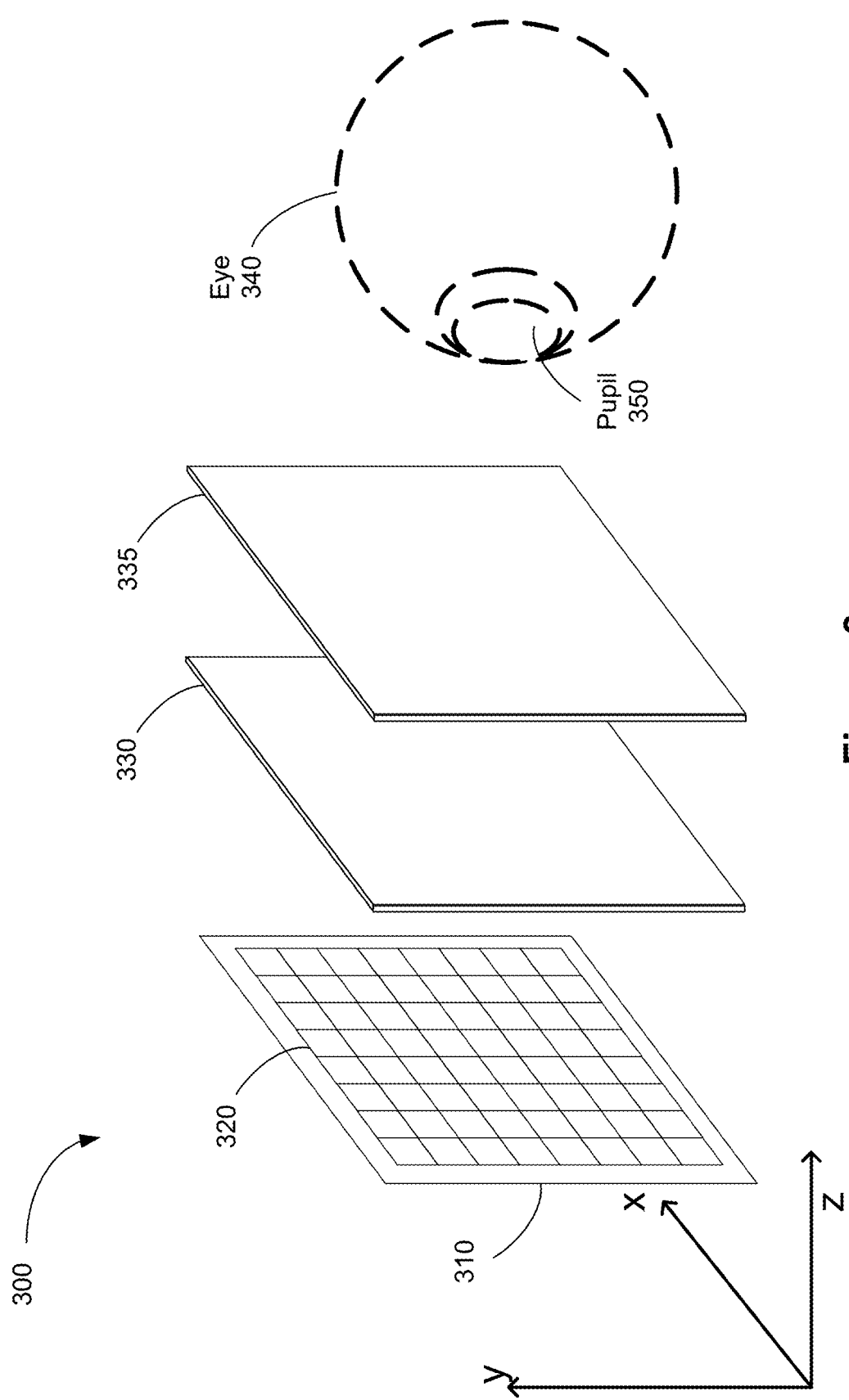

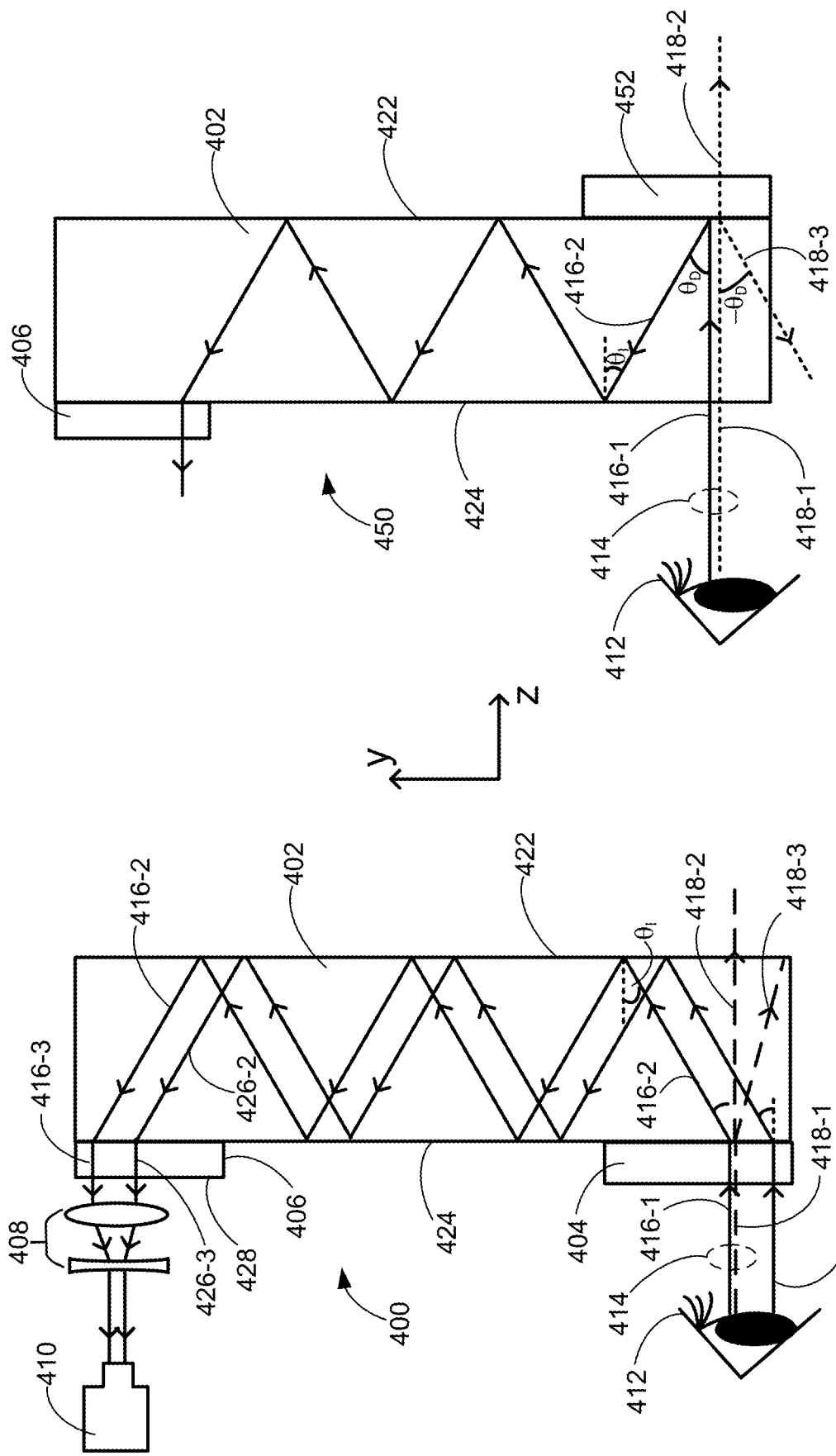

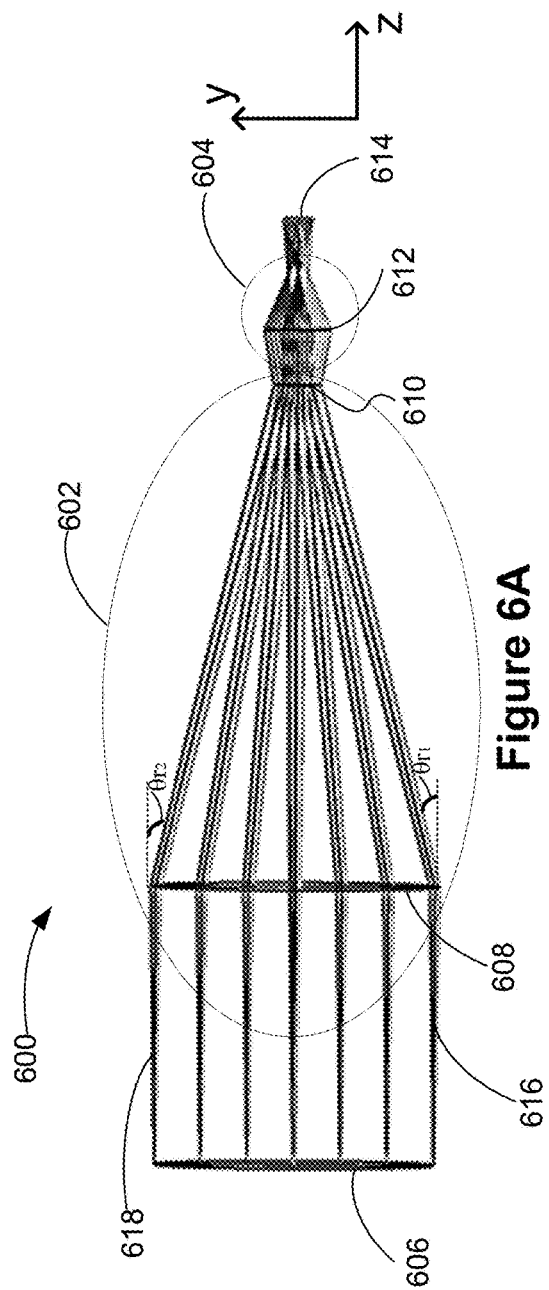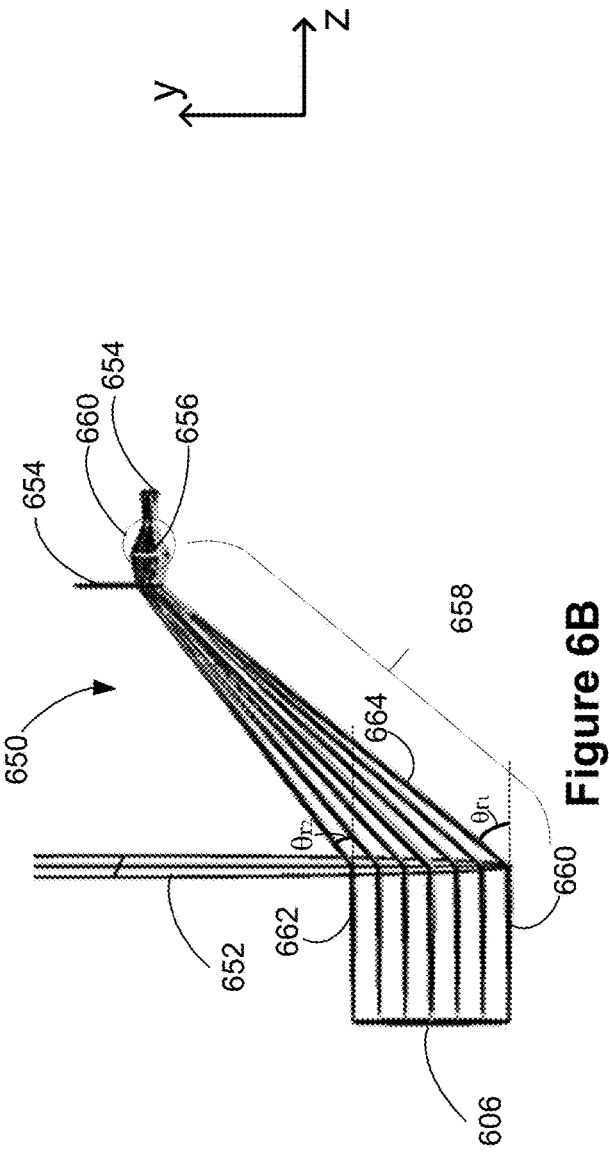
Figure 6A
Figure 6B

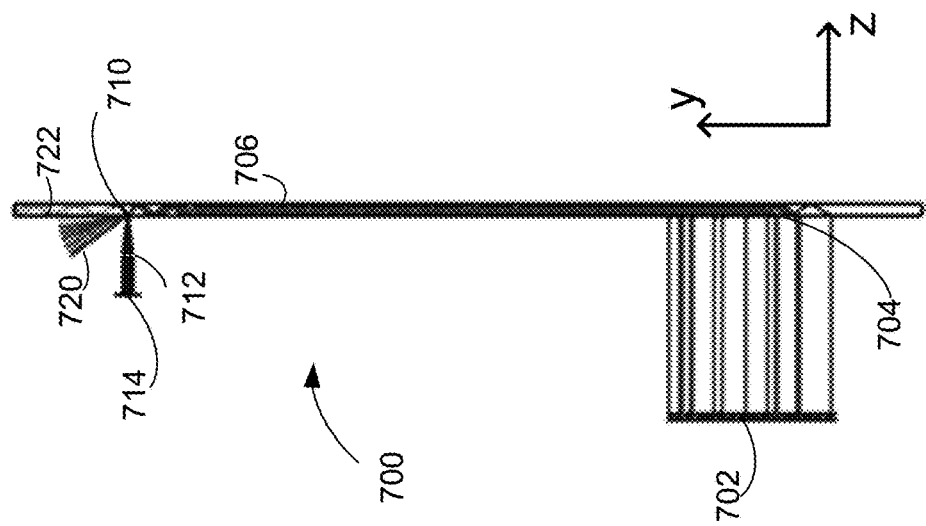
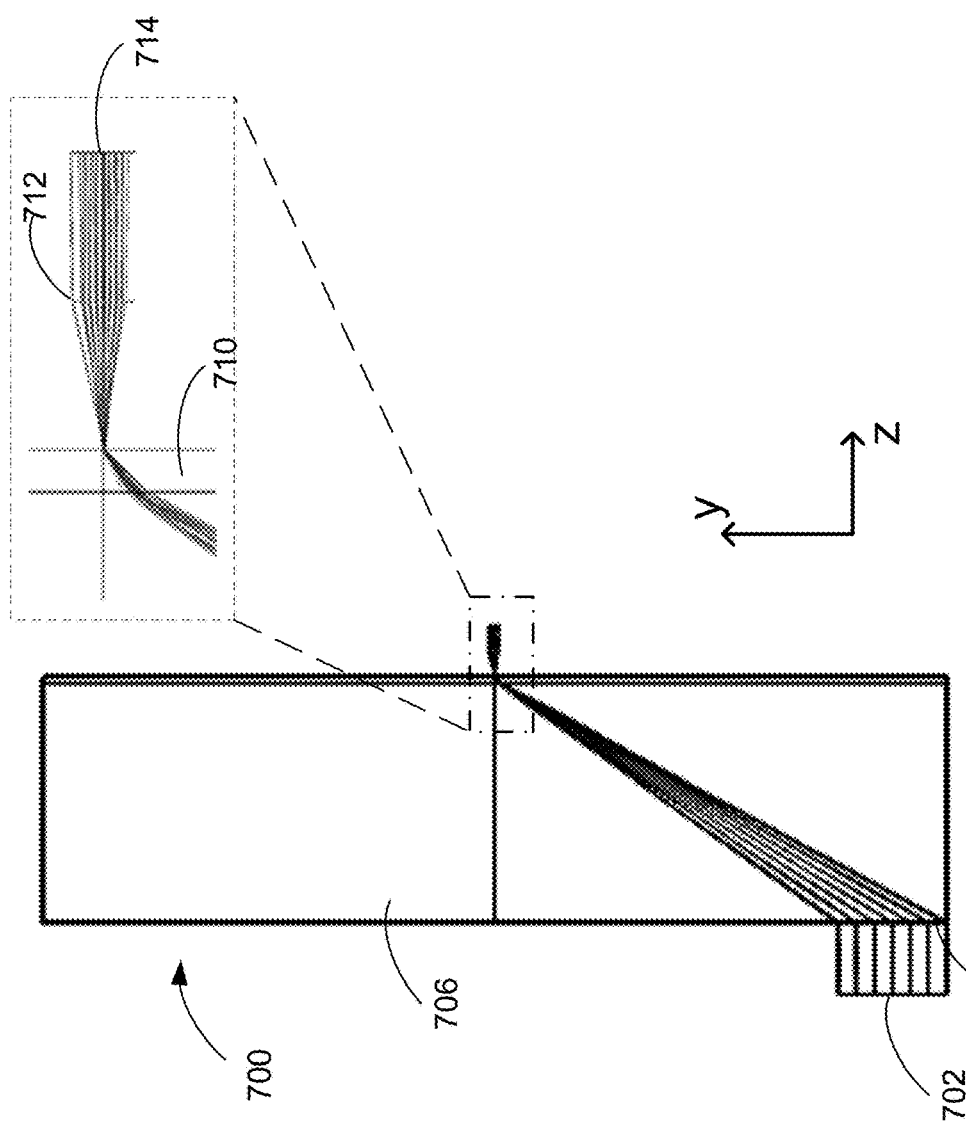
Figure 7A
Figure 7B

EYE TRACKING BASED ON WAVEGUIDE IMAGING

RELATED APPLICATIONS

This application is a continuation application of U.S. patent application Ser. No. 16/359,117, filed Mar. 20, 2019, which claims the benefit of, and priority to, U.S. Provisional Patent Application No. 62/804,136, filed Feb. 11, 2019, U.S. Provisional Patent Application No. 62/804,126, filed Feb. 11, 2019, and U.S. Provisional Patent Application No. 62/673,805, filed May 18, 2018, all of which are incorporated by reference herein in their entireties.

TECHNICAL FIELD

This disclosure relates generally to display devices, and more specifically to head-mounted display devices.

BACKGROUND

Head-mounted display devices (also called herein head-mounted displays) are gaining popularity as means for providing visual information to a user. For example, the head-mounted display devices are used for virtual reality and augmented reality operations. Eye tracking allows the head-mounted display devices to determine a user's gaze and provide visual information based on the user's gaze direction.

SUMMARY

Accordingly, there is a need for an eye-tracking system in a head-mounted display device that is compact and light.

The systems and methods disclosed in this description use waveguides and polarization-dependent optical elements (e.g., a polarization volume holographic element, a geometric phase lens, etc.) to address the technical challenges described above and additional technical challenges. A polarization-dependent optical element steers and in-couples light having a particular polarization (e.g., a right-handed circular polarization) into a waveguide so that the light is guided within the waveguide to an off-axis location, where the light is out-coupled from the waveguide. This allows placement of optical elements and detectors away from the user's view (e.g., the on-axis position). In addition, the waveguides and the polarization-dependent optical elements are in a telescopic configuration, thereby providing demagnified images (e.g., of an eye) and allowing a smaller (and lighter) detector to be used in the eye-tracking system. Furthermore, by utilizing the polarization-dependent optical elements, the detector in the eye-tracking system receives light having a particular polarization (and receives no or reduced intensity of light having a different polarization), which, in turn, reduces noise in the received light and improves the performance of the eye-tracking system. In some embodiments, the waveguides and the polarization-dependent optical elements are wavelength-specific and thus, allow transmission of visible light so that the eye-tracking system is compatible with augmented reality operations.

In accordance with some embodiments, an optical system includes an optical waveguide, and a first optical element configured to i) direct a first ray, having a first circular polarization and impinging on the first optical element at a first incidence angle, in a first direction so that the first ray propagates through the optical waveguide via total internal reflection toward a second optical element, and ii) direct a second ray, having a second circular polarization that is distinct from the first circular polarization and impinging on the first optical element at the first incidence angle, in a second direction that is distinct from the first direction so that the second ray propagates away from the second optical element. The second optical element is configured to direct the first ray propagating through the optical waveguide toward a detector.

In accordance with some embodiments, a method for relaying an image of an eye, the method includes receiving, at a first optical element, light from an eye of a user, wherein the first optical element is configured to: i) direct a first ray, having a first circular polarization and impinging on the first optical element at a first incidence angle, in a first direction so that the first ray propagates through the optical waveguide via total internal reflection toward a second optical element, and ii) direct a second ray, having a second circular polarization that is distinct from the first circular polarization and impinging on the first optical element at the first incidence angle, in a second direction that is distinct from the first direction so that the second ray propagates away from the second optical element. The method includes directing, with a second optical element, the first ray out of the optical waveguide toward a detector.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 3 is an isometric view of a display device in accordance with some embodiments.

FIG. 4A is an example optical system in accordance with some embodiments.

FIG. 4B is an example optical system in accordance with some embodiments.

FIG. 6A is an example of a paraxial optical system in accordance with some embodiments.

FIG. 6B is an example of an off-axis optical system in accordance with some embodiments.

FIG. 7A is an example optical system in accordance with some embodiments.

FIG. 7B is an example optical system in accordance with some embodiments.

These figures are not drawn to scale unless indicated otherwise.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first light projector could be termed a second light projector, and, similarly, a second light projector could be termed a first light projector, without departing from the scope of the various described embodiments. The first light projector and the second light projector are both light projectors, but they are not the same light projector.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

Figure 1:
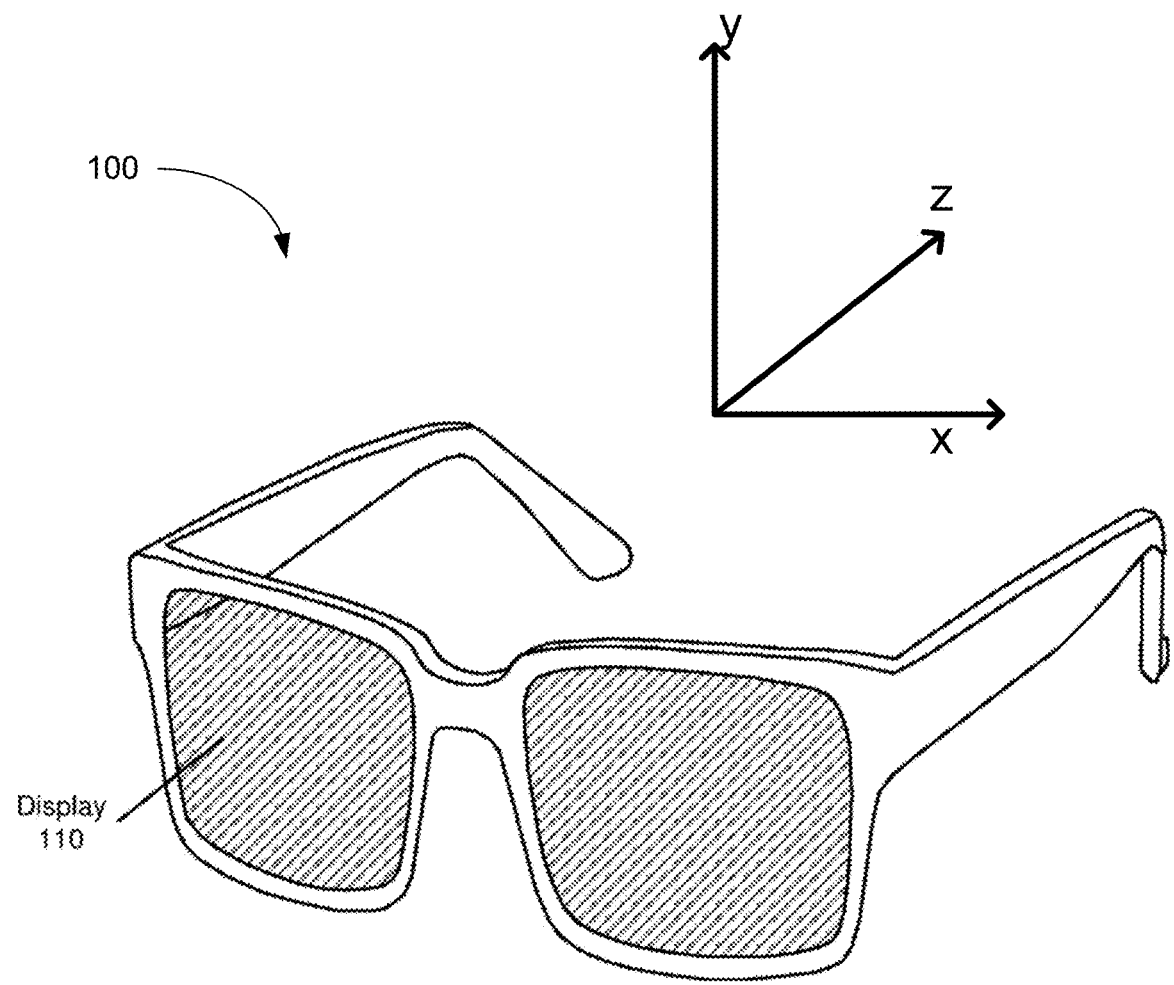
FIG. 1 is a perspective view of a display device in accordance with some embodiments.

FIG. 1 illustrates display device 100 in accordance with some embodiments. In some embodiments, display device 100 is configured to be worn on a head of a user (e.g., by having the form of spectacles or eyeglasses, as shown in FIG. 1) or to be included as part of a helmet that is to be worn by the user. When display device 100 is configured to be worn on a head of a user or to be included as part of a helmet, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user). As shown in FIG. 1, display device 100 includes display 110. Display 110 is configured for presenting visual contents (e.g., augmented reality contents, virtual reality contents, mixed reality contents, or any combination thereof) to a user.

Figure 2:
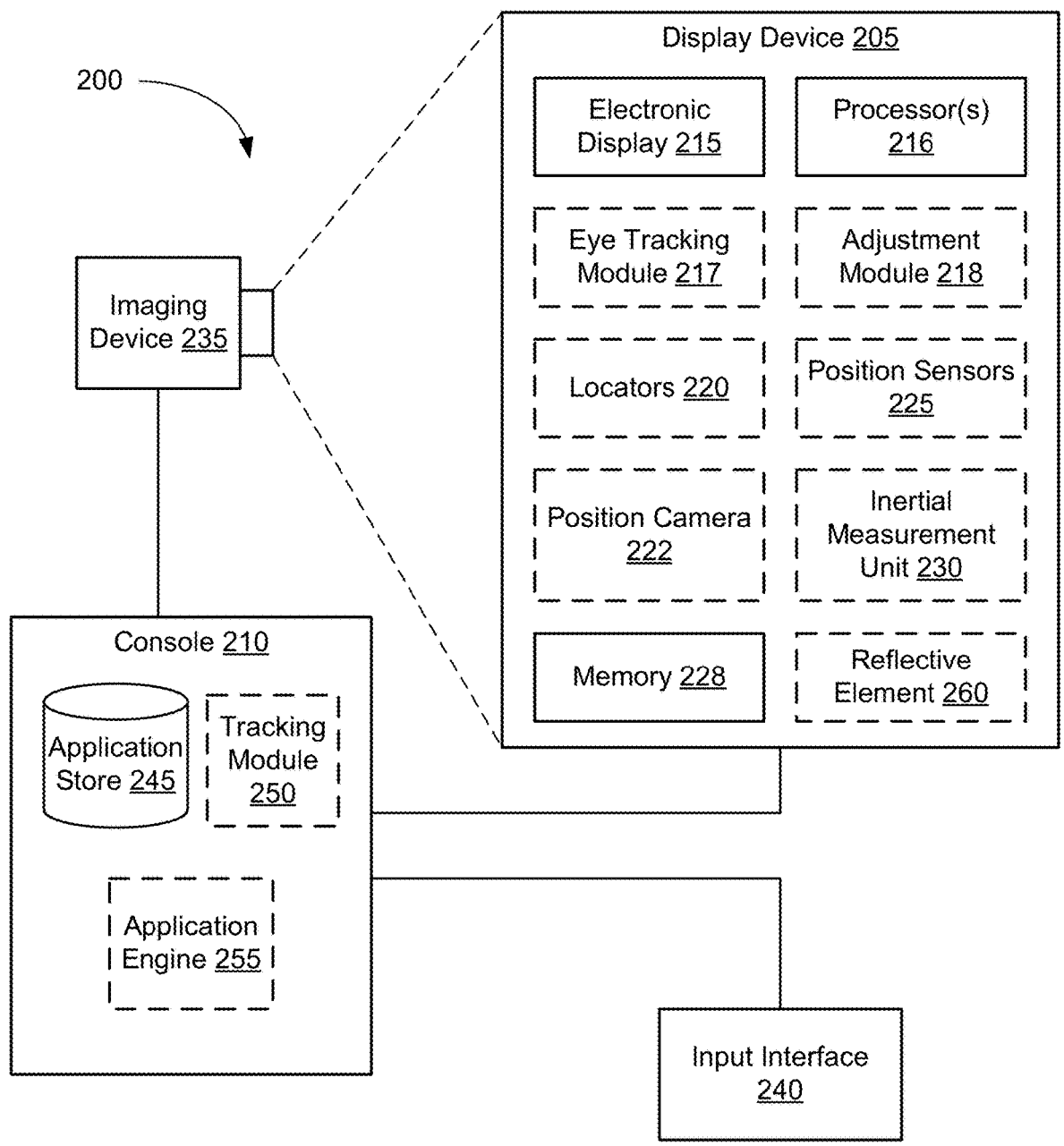
FIG. 2 is a block diagram of a system including a display device in accordance with some embodiments.

In some embodiments, display device 100 includes one or more components described herein with respect to FIG. 2. In some embodiments, display device 100 includes additional components not shown in FIG. 2.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including one display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver augmented reality, virtual reality, and mixed reality.

In some embodiments, as shown in FIG. 1, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in an augmented environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an augmented reality (AR) device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, one or more reflective elements 260 or a subset or superset thereof (e.g., display device 205 with electronic display 215, one or more processors 216, and memory 228, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable display element or multiple adjustable display elements (e.g., a display for each eye of a user). In some embodiments, electronic display 215 is configured to display images to the user by projecting the images onto one or more reflective elements 260.

In some embodiments, the display element includes one or more light emission devices and a corresponding array of spatial light modulators. A spatial light modulator is an array of electro-optic pixels, opto-electronic pixels, some other array of devices that dynamically adjust the amount of light transmitted by each device, or some combination thereof. These pixels are placed behind one or more lenses. In some embodiments, the spatial light modulator is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The spatial light modulator is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array. In some embodiments, electronic display 215 projects images to one or more reflective elements 260, which reflect at least a portion of the light toward an eye of a user.

One or more lenses direct light from the arrays of light emission devices (optionally through the emission intensity arrays) to locations within each eyebox and ultimately to the back of the user's retina(s). An eyebox is a region that is occupied by an eye of a user located proximity to display device 205 (e.g., a user wearing display device 205) for viewing images from display device 205. In some cases, the eyebox is represented as a 10 mm×10 mm square. In some embodiments, the one or more lenses include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is used to also determine location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described herein.

Adjustment module 218 generates an image frame based on the determined locations of the pupils. In some embodiments, this sends a discrete image to the display that will tile subimages together thus a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display to not pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is configured to optionally detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light towards the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

In some embodiments, display device 205 optionally includes one or more reflective elements 260. In some embodiments, electronic display device 205 optionally includes a single reflective element 260 or multiple reflective elements 260 (e.g., a reflective element 260 for each eye of a user). In some embodiments, electronic display device 215 projects computer-generated images on one or more reflective elements 260, which, in turn, reflect the images toward an eye or eyes of a user. The computer-generated images include still images, animated images, and/or a combination thereof. The computer-generated images include objects that appear to be two-dimensional and/or three-dimensional objects. In some embodiments, one or more reflective elements 260 are partially transparent (e.g., the one or more reflective elements 260 have a transmittance of at least 15%, 20%, 25%, 30%, 35%, 40%, 45%, or 50%), which allows transmission of ambient light. In such embodiments, computer-generated images projected by electronic display 215 are superimposed with the transmitted ambient light (e.g., transmitted ambient image) to provide augmented reality images.

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described herein may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in an augmented environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

FIG. 3 is an isometric view of display device 300 in accordance with some embodiments. In some other embodiments, display device 300 is part of some other electronic display (e.g., a digital microscope, a head-mounted display device, etc.). In some embodiments, display device 300 includes light emission device array 310 and one or more lenses 330. In some embodiments, display device 300 also includes an IR detector array.

Light emission device array 310 emits image light and optional IR light toward the viewing user. Light emission device array 310 may be, e.g., an array of LEDs, an array of microLEDs, an array of OLEDs, or some combination thereof. Light emission device array 310 includes light emission devices 320 that emit light in the visible light (and optionally includes devices that emit light in the IR).

In some embodiments, display device 300 includes an emission intensity array configured to selectively attenuate light emitted from light emission array 310. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner, the emission intensity array is able to control what portion of the image light emitted from light emission device array 310 is passed to the one or more lenses 330. In some embodiments, display device 300 uses an emission intensity array to facilitate providing image light to a location of pupil 350 of eye 340 of a user, and minimize the amount of image light provided to other areas in the eyebox.

One or more lenses 330 receive the modified image light (e.g., attenuated light) from emission intensity array (or directly from emission device array 310), and direct the modified image light to a location of pupil 350.

An optional IR detector array detects IR light that has been retro-reflected from the retina of eye 340, a cornea of eye 340, a crystalline lens of eye 340, or some combination thereof. The IR detector array includes either a single IR sensor or a plurality of IR sensitive detectors (e.g., photodiodes). In some embodiments, the IR detector array is separate from light emission device array 310. In some embodiments, the IR detector array is integrated into light emission device array 310.

In some embodiments, light emission device array 310 and an emission intensity array make up a display element. Alternatively, the display element includes light emission device array 310 (e.g., when light emission device array 310 includes individually adjustable pixels) without the emission intensity array. In some embodiments, the display element additionally includes the IR array. In some embodiments, in response to a determined location of pupil 350, the display element adjusts the emitted image light such that the light output by the display element is refracted by one or more lenses 330 toward the determined location of pupil 350, and not toward other locations in the eyebox.

In some embodiments, display device 300 includes one or more broadband sources (e.g., one or more white LEDs) coupled with a plurality of color filters, in addition to, or instead of, light emission device array 310.

FIG. 6A shows an illustrative "unfolded" (e.g., all optical elements are arranged without a "folding" optical element, such as a waveguide) and on-axis configuration (e.g., the geometric center of the optical elements coincide with the principal axis of the optical elements) of an example optical system 600 in accordance with some embodiments. The optical system 600 includes two relay systems, a first relay system 602 that includes a first optical element 608 and a second optical element 610. The first relay system 602 receives light from an object (e.g., an eye 606 of a wearer of a device that includes the optical system 600). The first optical element 608 has converging/focusing powers. Light bundles from the eye 606 that strike the first optical element 608 over a larger height along the y-direction converge to a smaller height when they strike the second optical element 610. The second optical element 610 has diverging optical power and light bundles diverge along the y-direction after interacting with the second optical element 610. In some embodiments, the positive lensing effect (e.g., converging) of the first optical element 608 and the negative lensing effect (e.g., diverging) of the second optical element 610 allow the first and second optical elements to form a Galilean telescope (e.g., formed from a positive lens followed by a negative lens). In some embodiments, the first relay system 602 contains a Keplerian telescope (e.g., formed from two positive lenses). In some embodiments, the first and second optical elements form the telescope. In some embodiments, the telescope includes additional optical elements within the first relay system 602. In some embodiments, the additional optical elements are provided within the optical waveguide 402.

The second relay system 604 is arranged downstream of the first relay system 602 and images light bundles emerging from second optical element 610 onto a detector 614. In FIG. 6A, the second relay system 604 in the example optical system 600 includes a single optical element 612 (e.g., a converging lens). In some embodiments, the second relay system 604 includes additional optical elements. In some embodiment, the second relay system 604 includes a telescope. In some embodiments, the second relay system 604 is a Galilean telescope. In some embodiments, the second relay system 604 is a Keplerian telescope. A detector 614 (e.g., CCD camera containing a sensor element) is positioned on an image plane of the optical element 612. In the example optical system 600, the second relay system 604 images the output of the first relay system 602 at a reduced magnification onto the detector 614 (an extent of the imaging light along the y-axis at the detector 614 is smaller than an extent of the imaging light striking the optical element 612). In some embodiments, the second optical relay system is downstream of the first optical relay system and receives the output from the first optical relay system as its input.

FIG. 6B shows an "unfolded" (e.g., all optical elements are arranged without a "folding" optical element, such as a waveguide) and off-axis configuration (e.g., the geometric center of any of the optical elements does not coincide with the principal axis of any other optical elements) of an optical system 650 according to some embodiments. Optical elements in optical system 600 in FIG. 6A are arranged paraxially, but those in optical system 650 in FIG. 6B are arranged in an off-axis manner.

Like the optical system 600, the optical system 650 has a first relay system 658 that includes a first optical element 652 and a second optical element 654. Both FIGS. 6A and 6B show Galilean telescopes in the first relay system. The first optical element 652 has converging optical power (e.g., a positive lens) and the second optical element 654 has diverging optical power (e.g., a negative lens). In some embodiments, the first optical element 652 is a positive lens and light bundles from the eye 606 impinge on the first optical element 652 in a decentered way. For example, the first optical element 652 is a decentered lens (e.g., a lens having a principal axis of the lens offset from the geometric center of the lens). In some embodiments, the principal axis of the decentered lens is located away from (e.g., outside) the lens. In this way, a light bundle 660 from one edge of the eye 606 is refracted by a larger angle $\theta r_1$ compared to a light bundle 662 from the other edge of the eye, which is refracted by the first optical element 652 by a smaller angle $\theta r_2$. Thus, in some embodiments, light bundles emerging symmetrically (in the y-z plane) are refracted differently when they strike the first optically element in an off-axis/decentered way. In contrast, an outermost light bundle 616 in FIG. 6A (impinging on a centered lens) is refracted by the same angle $\theta r_1$ compared to another outermost light bundle 618. The angles $\theta r_1$ and $\theta r_2$ have the same magnitude and different signs in FIG. 6A.

In some embodiments, the first optical element 652 is a geometric phase element. In some embodiments, the first optical element 652 is a geometric phase lens. Circularly polarized light takes on this phase profile directly through the geometric phase (also called the Pancharatnam-Berry phase) effect (e.g., a phase profile of the geometric phase lens is added to the original phase (the phase before the light passes through the geometric phase lens)). The light bundle 660 includes a first ray 664 having a first circular polarization and a second ray (not illustrated) having a second circular polarization different from the first circular polarization. The first optical element 652 directs the first ray 664 along a direction having an angle of $\theta r_1$ to the z-axis. In some embodiments, the second ray having a second circular polarization different from the first circular polarization is transmitted through the first optical element 652. In some embodiments, the first optical element 652 directs the second ray in an opposite direction to the first ray, at an angle of $-\theta r_1$ onto the z-axis.

The first rays from the various light bundles impinge on the second optical element 654 in an off-centered manner (e.g., off-axis, the second optical element is not illuminated symmetrically about its axis of symmetry or its principal axis). In some embodiments, the second optical element 654 is a negative lens, and the first rays diverge after impinging on the second optical element 654. In some embodiments, the decentered negative lens of the second optical element 654 corrects aberrations (e.g., distortion). In some embodiments, the first optical element 652 and the second optical element 654 are the positive lens and the negative lens, respectively, of a Galilean telescope that forms the first relay system 658.

In some embodiments, a single converging lens 656 forms the second relay system 660. The lens 656 images the output of the first relay system 658 onto a detector 654.

FIG. 4A show an optical system 400 in accordance with some embodiments. The optical system 400 includes a waveguide 402 (e.g., an optical waveguide that guides electromagnetic radiation having a wavelength greater than 400 nm, greater than 800 nm, greater than 1000 nm, or greater than 2000 nm along a long axis (e.g., y-axis in FIG. 4A) of the optical waveguide), a first optical element 404, a second optical element 406, imaging optical elements 408 and a detector 410 used to image light from an eye 412 of a user of the optical system 400 (e.g., a user wearing a device, such as a head-mounted display, a VR display headset, or an AR display headset, that includes the optical system 400). Compared to the on-axis system shown in FIG. 6A, the waveguide 402 in FIG. 4A allows the trajectories of rays within it to be "folded," thereby resulting in a more compact system.

A light bundle 414 from the eye 412 (e.g., light reflected off the eye 412) includes a first ray 416-1 and a second ray 418-1. The first ray 416-1 has a first circular polarization (e.g., right-hand circularly polarized light (RCP)) and the second ray 418-1 has a second circular polarization (e.g., left-hand circularly polarized light (LCP)) different from the first circular polarization. The light bundle 414 impinges on the first optical element 404 at a first incidence angle. In some embodiments, a light bundle impinges on the first optical element 404 at a range of incidence angles. In some embodiments (as shown in FIG. 4A), the light bundle 414 impinges on the first optical element 404 at normal incidence (i.e., an incidence angle of 0°).

In some embodiments, the first optical element 404 is configured to direct the first ray 416-1 in a first direction along a diffraction angle $\square_D$ (e.g., as first ray 416-2) and direct the second ray 418-1 in a second direction different from the first direction. In some embodiments, the first optical element directs the second ray 418-1 in a second direction by transmitting the second ray 418-1 through the optical waveguide 402 without any diffraction. In some embodiments, the first optical element directs the second ray by diffracting the second ray along a direction at a (e.g., negative, relative to the diffraction angle of the first ray 416-1) diffraction angle $\square_D$ (e.g., the first ray 416-1 is diffracted into a diffraction order of +1 and the ray 418-1 is diffracted into a diffraction order of −1) as a second ray 418-3. The second ray 418-2 and the second ray 418-3 are both directed in directions that cause the second rays to propagate away from the second optical element 406.

In some embodiments, the first ray 416-1 has a first wavelength and the second ray 418-1 has a second wavelength different from the first wavelength. In some embodiments, the first wavelength is greater than 850 nm (e.g., greater than 900 nm, greater than 1000 nm, greater than 1500 nm, greater than 2000 nm), and the second wavelength is less than 850 nm (e.g., less than 800 nm, less than 700 nm, less than 600 nm). In some embodiments, the first wavelength and the second wavelength are different, and both are greater than 800 nm. In some embodiments, the first optical element 404 diffracts light within a wavelength range (e.g., greater than 800 nm, between 800 nm and 2000 nm) and transmits light outside that wavelength range. In some embodiments, the first optical element 404 diffracts light impinging on it that is incident within an incidence angle range (e.g., between +20° to −20° from a normal of the surface of incidence, between +10° to −10° from a normal of the surface of incidence, between +5° to −5° from a normal of the surface of incidence, between +2° to −2° from a normal of the surface of incidence).

In some embodiments, the first optical element 404 is a polarization volume holographic element. In some embodiments, the first optical element is a geometric phase lens, similar to those described in a co-pending patent application Ser. No. 15/833,676, entitled "Geometric Phase Lens Alignment in an Augmented Reality Head Mounted Display", filed on Dec. 6, 2017, which is incorporated herein by reference in its entirety.

The first optical element 404 diffracts the first ray 416-1 in a forward direction into the first ray 416-2 so that it is incident on a back surface 422 of the optical waveguide 402 at an incidence angle of $\theta_I$, the incidence angle being equal or greater than a critical angle of the optical waveguide 402. For example, in embodiments where the optical waveguide 402 is made of a material having an index of refraction n at a wavelength $\lambda_1$, the critical angle $\theta_c$ at the material-air interface for light having a wavelength $\lambda_1$ is $\sin^{-1}(n_{air}/n)$ (i.e., the inverse sine of the ratio of the index of refraction of air $n_{air}$ and the index of refraction n at wavelength $\lambda_1$). The first ray is thus reflected by total internal reflection (TIR) at the back surface 422 to impinge on the first surface 424 again at an angle (e.g., with a magnitude that is the same as that of the incidence angle $\theta_I$) that is greater than $\theta_c$. The first optical element 404 couples in light from the eye 412 so that it is guided along the long axis (e.g., y-axis) of the optical waveguide 402. After undergoing one or more total internal reflections at the material-air interfaces of the optical waveguide 402 (e.g., the back surface 422 and the front surface 424), the first ray 416-2 impinges on the front surface 424 at a location where the second optical element 406 is disposed. In some embodiments, the second optical element 406 is deposited on the optical waveguide 402. In some embodiments, the second optical element 406 is coated on the optical waveguide 402. The second optical element 406 out-couples the first ray 416 from the optical waveguide 402, so the first ray 416-2 is not guided further along the optical waveguide 402 (e.g., the first ray 416-2 ceases to be reflected by in the optical waveguide 402). In some embodiments, the second optical element 406 is a polarization volume holographic element. In some embodiments, the second optical element 406 is a geometric phase lens. In some embodiments, the second optical element 406 is a polarization grating. In some embodiments, the second optical element 406 is an output mirror. In some embodiments, the second optical element 406 is an output grating.

The second optical element 406 directs the first ray 416-2 so that the directed first ray 416-3 propagates substantially parallel to the z-axis (e.g., the ray makes an angle of less than 20° with the z-axis, the ray makes an angle of less than 10° with the z-axis, the ray makes an angle of less than 5° with the z-axis, the ray makes an angle of less than 2° with the z-axis, the ray makes an angle of less than 1° with the z-axis) after leaving the optical waveguide 402.

FIG. 4A shows another ray 426-1 from the eye 412 in a direction parallel to the light bundle 414. In FIG. 4A, the first optical element 404 also diffracts the ray 426-1 into the ray 426-2 in a direction parallel to the first ray 416-2. As a result, the ray 426-2 is guided through the optical waveguide 402 along an optical path displaced along the y direction with respect to the first ray 416-2. Imaging optical elements 408, which are downstream of the second optical element 406 (e.g., positioned after the second optical element 406 along an optical path beginning at the eye 412 and ending at a detector 410), image both the first ray 416 and the ray 426 onto the detector 410 so that an image of the eye 412 (e.g., an image of a pupil of the eye 412) is formed at the detector 410 (e.g., the detector 410 is positioned at an image plane of the imaging optical elements 408). In some embodiments, the object plane of the imaging optical elements 408 is on or near an exit surface of the second optical element 406. In some embodiments, the exit surface is a surface 428 of the second optical element 406 that is closest to the detector 410, which may define a material-air interface. In some embodiments, imaging optical elements 408 form a relay system that images an output from the optical waveguide 402 onto the detector 410.

In some embodiments, a first relay system relays (or images) rays (e.g., the light bundle 414, the ray 426-1) from the eye 412 onto a plane (e.g., an image plane, an output plane of the optical waveguide 402), which, in turn, is the object plane for a second relay system (e.g., the imaging optical elements 408). In some embodiments, the first optical element 404 and the second optical element 406 collectively form the first relay system.

FIG. 4B shows an optical system 450 in accordance with some embodiments. The light bundle 414 from the eye 412 transmits through the front surface 424 of the optical waveguide 402 and is coupled into the optical waveguide 402. The light bundle 414 contains the first ray 416-1 having the first circular polarization and a ray 418-1 having a second circular polarization different from the first circular polarization. The light bundle 414 strikes a reflective first optical element 452 disposed on the back surface 422 of the optical waveguide 402. The reflective first optical element 452 diffracts the first ray 416-1 having the first circular polarization in a reflective manner (e.g., in a backward direction) at a diffraction angle $\theta_D$ towards the front surface 424 of the optical waveguide 402 as the diffracted first ray 416-2. The first ray 416-2 strikes the front surface 424 at an incidence angle $\theta_I$ equal to $\theta_D$. The reflective first optical element 452 is configured so that the $\theta_D$ (and thus $\theta_I$) is equal or greater than the critical angle of the optical waveguide 402. In this way, the first ray 416 is reflected by total internal reflection within the optical waveguide and guided along its long axis (e.g., along the y direction). In some embodiments, the second ray 418-1 having a second circular polarization different from the first circular polarization is simply transmitted through the reflective first optical element 452 as the transmitted second ray 418-2, and propagates away from the second optical element 406. In some embodiments, the second ray 418-1 having the second circular polarization is diffracted in the opposite direction at an angle $-\theta_D$ as the diffracted second ray 418-3 and propagates away from the second optical element 406. The first ray 416-2 is coupled out of the optical waveguide 402 by the second optical element 406 in a similar manner as described with respect to FIG. 4A.

For ease of illustration, the first optical element 402 is not shown to have optical power (e.g., focusing power, converging power, diverging power) in FIG. 4A—a distance between the first ray 416 (within the light bundle 414) and the ray 426 at the second optical element 406 (e.g., the distance between the first ray 416-3 and the second ray 426-3) is substantially the same as the distance between them at the first optical element 404 (e.g., the distance between the first ray 416-1 and the second ray 416-3). In some embodiments, the first optical element has focusing power, and the distance between the rays at the second optical element 406 is reduced compared to their distance at the first optical element 404 (e.g., a demagnified image is formed). In some embodiments, the first optical element has a coating that provides focusing power. In some embodiments, the first optical element is formed of a material that provides focusing power.

Figure 5A:
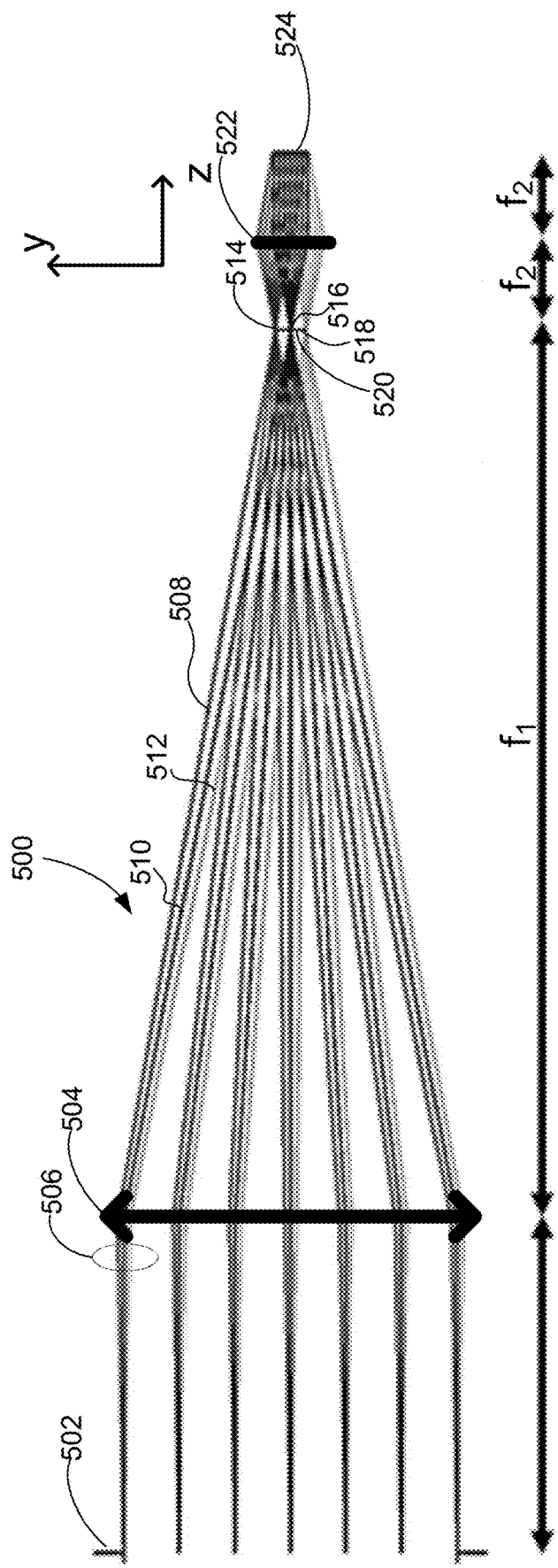
FIG. 5A is an example optical system in accordance with some embodiments.

FIG. 5A shows an "unfolded" configuration of an optical system 500 that includes a telescope for forming an image of an object on a detector. The "unfolded" configuration shows various optical elements, along the z-axis, sequentially arranged in the optical system 500 without one or more reflections within a waveguide. Light bundles along the y-axis emerge from the object (e.g., eye 502) and impinge on the first optical element 504.

In some embodiments, the first optical element 504 (which is sometimes called the input grating) has focusing power. For example, the first optical element 504 in FIG. 5A has a focal length of $f_1$. The second optical element 520 is positioned at a distance $f_1$ away from the first optical element 504. In some embodiments, the second optical element 520 does not have focusing power, as shown in FIG. 5A, and is used (e.g., only) to couple out light guided by the waveguide. In some embodiments, a width of the spectrum of light bundles from the eye 502 is narrowest at the second optical element 520. Positioning the second optical element 520 at this location allows the smallest second optical element 520 to be used without losing much of the light downstream of the first optical element 504.

As in a Galilean telescope, a lens 522 (e.g., a camera lens) having a focal length $f_2$ is positioned so that the second optical element 520 is placed $f_2$ away from the lens 522 (i.e., at the back focal plane of the lens 522). A demagnified image of the eye 502 is formed at a distance $f_2$ away from the lens 522 (i.e., at the front focal plane of the lens 522), at a detector 524 (e.g., a CCD camera having a sensor element). The demagnification depends on the focal lengths $f_1$ and $f_2$.

Figure 5B:
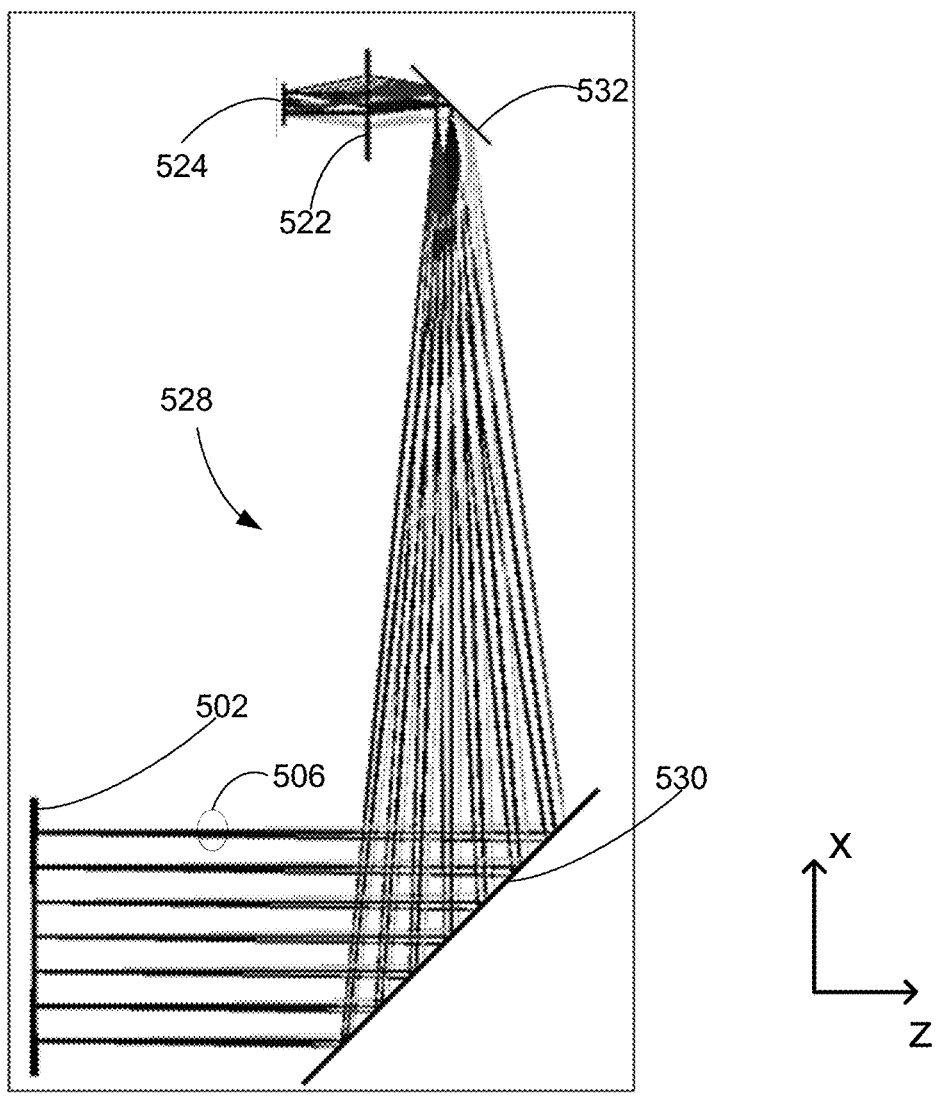
FIG. 5B is an example optical system in accordance with some embodiments.

FIG. 5B shows an optical system 528, which corresponds to the optical system 500 in a partially folded configuration, without a waveguide. The first optical element 530 is shown as a reflective input grating having a focal length of $f_1$ (though depicted as a planar surface) and the second optical element 532 is a planar mirror, positioned $f_1$ away from the first optical element 530. All optical elements in FIG. 5B are positioned at the same distances as shown in FIG. 5A (e.g., a representative distance between the second optical element 532 and the lens 522 is $f_2$ and the distance between the lens 522 and the detector 524 is also $f_2$).

Figure 5D:
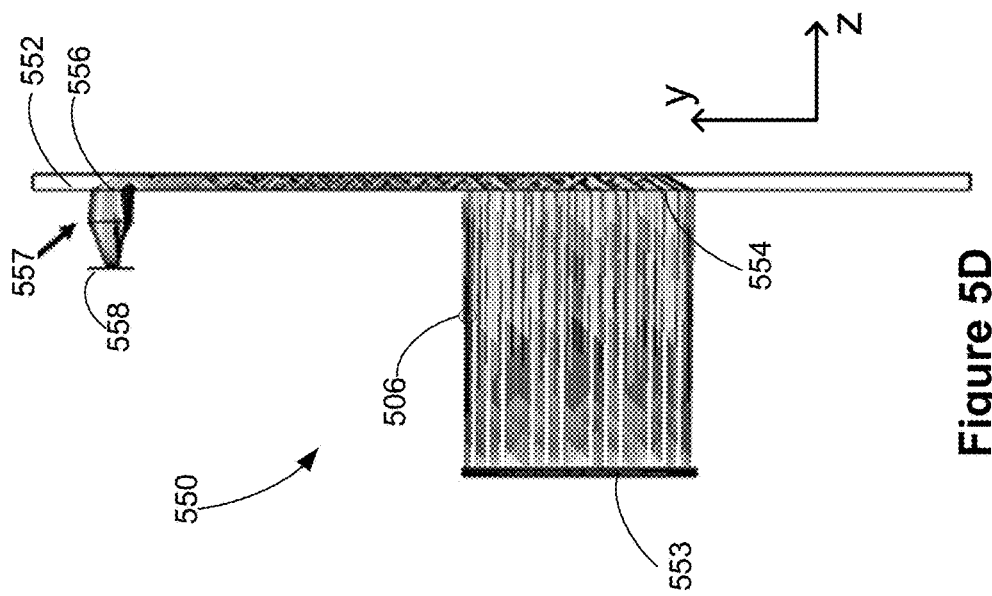
FIG. 5D is an example optical system in accordance with some embodiments.
Figure 5C:
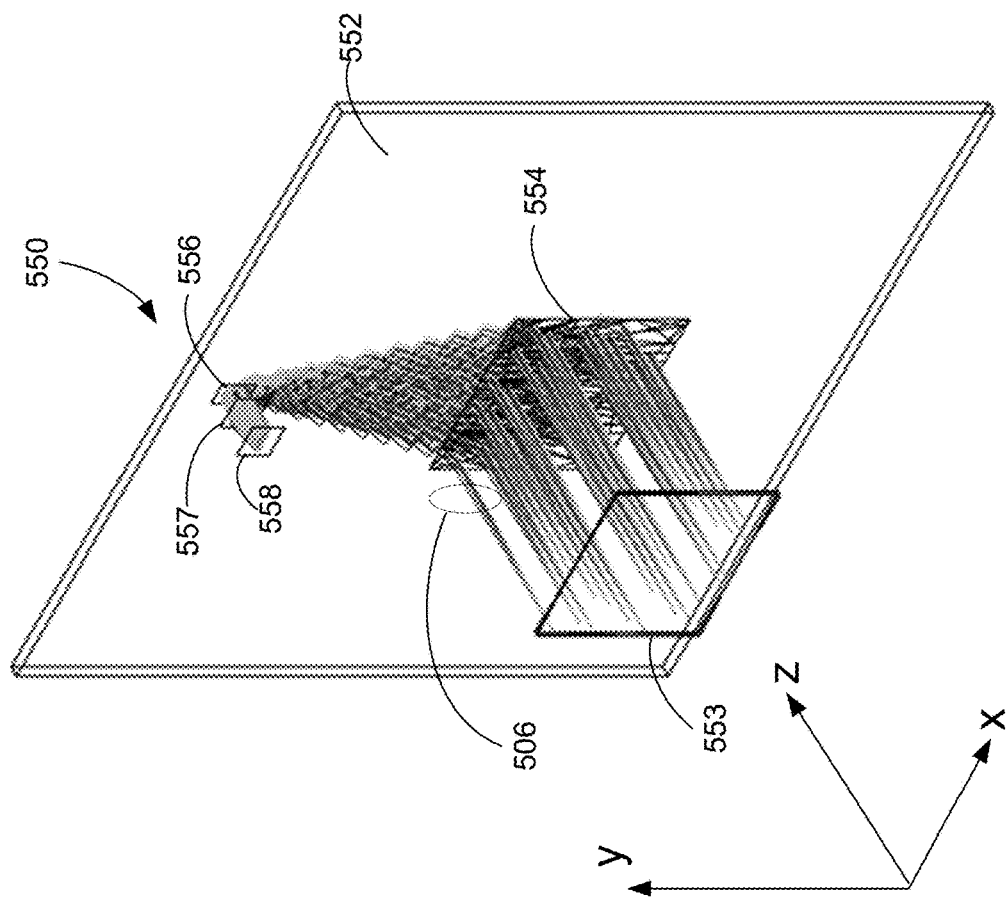
FIG. 5C is an example optical system in accordance with some embodiments.

FIG. 5C shows a perspective view of an optical system 550 that includes a waveguide 552. FIG. 5D is a y-z plane cross-sectional view of the optical system 550. The eye 502 is represented by an eye-box 553, and light bundles (including the light bundle 506) from a x-y plane containing the eye-box 553 impinge on a first optical element 554 disposed on the waveguide 552. The first optical element 554 couples in rays of the light bundles that have a first circular polarization. Rays that have a second circular polarization different from the first circular polarization (e.g., first circular polarization is RCP and second circular polarization is LCP; or first circular polarization is LCP and second circular polarization is RCP) are not directed by the first optical element 554 to undergo total internal reflection within the waveguide 552. As a result, rays having a second circular polarization propagate away from the second optical element 556. For example, rays of the second polarization transmit through the waveguide 552 or are diffracted by the first optical element 554 in a direction opposite to the diffraction direction of the rays having the first polarization. In some embodiments, rays of the first polarization guided within the waveguide 552 travel up along the y-direction and the second optical element 556 disposed on the waveguide 552 couples out those rays, directing them substantially along the z direction. A lens 557 images the rays onto a detector 558. In some embodiments, the detector 558 is placed vertically above (and closer to the waveguide than) the eye. The first optical element 554 has focusing power and demagnifies the imaging light bundles from the eye 502 when the guided rays are coupled out of the waveguide 552. In this way, the detector 558 has a detection surface in the x-y plane that is smaller than the area of the eye-box 553.

In some embodiments, the first optical element 554 is configured to receive an input light and steer the input light by a first angle in a first direction that is parallel to the first optical element 554 and by a second angle in a second direction that is parallel to the first optical element 554 and perpendicular to the first direction. In some embodiments, the first angle is distinct from the second angle. For example, in some embodiments, the first optical element 554 steers the input light by the first angle (e.g., by less than 10 degrees, by less than 5 degrees, by less than 3 degrees, by less than 2 degrees, by less than 1 degree) toward the y direction and by the second angle toward the x direction (e.g., by less than 6 degrees, by less than 3 degrees, by less than 2 degrees, by less than 1 degree, by less than 0.5 degree). In some embodiments, the second angle is less than the first angle.

Figure 5E:
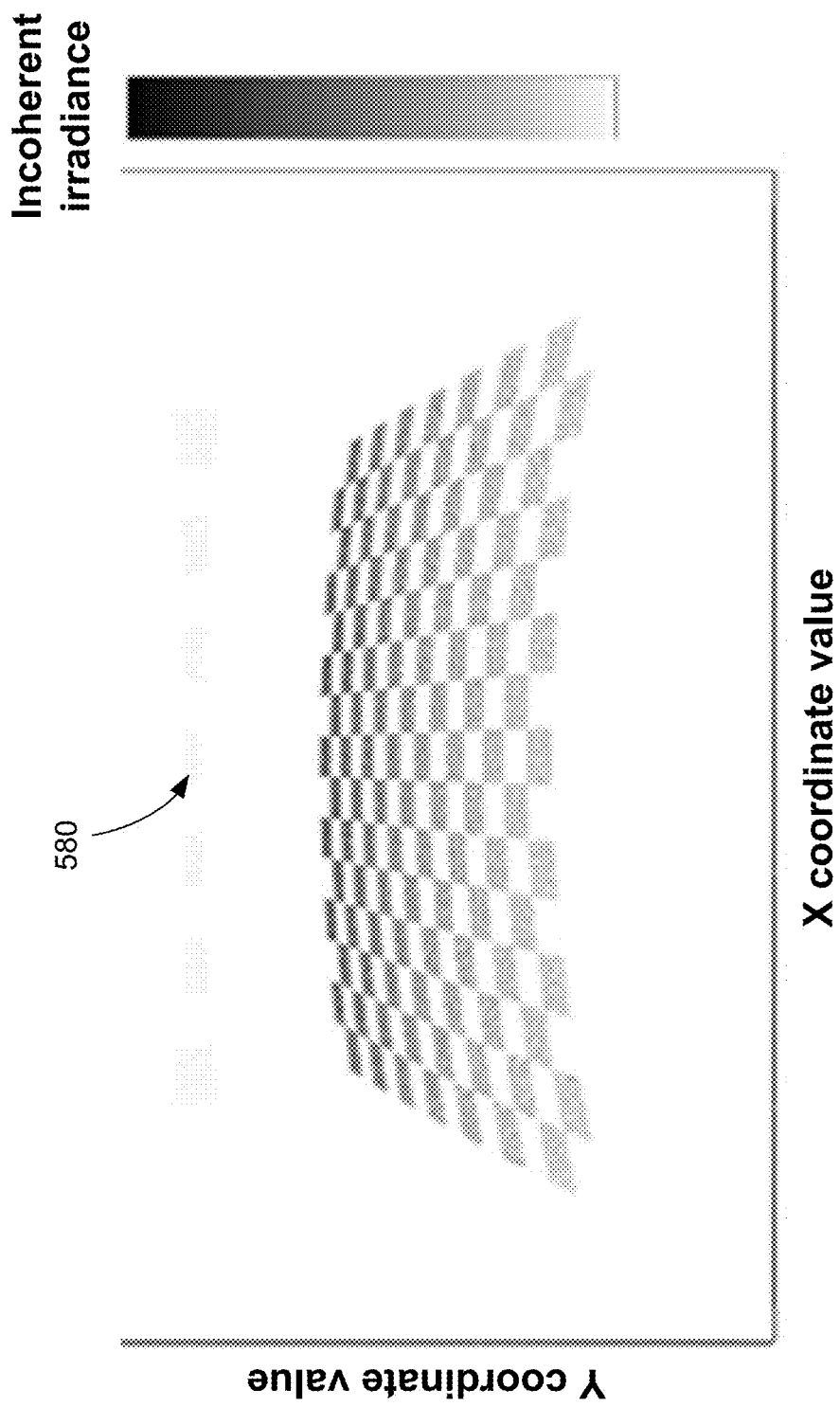
FIG. 5E shows an example of distortion in an optical system.

FIG. 5E shows the distortion in the x-y plane observed at the detector 558 for rays incident at the first optical element 554 at incidence angles within ±0.1° of a surface normal of the first optical element 554. Distortion is a form of optical aberration and is a deviation from rectilinear projection (i.e., straight lines emerging from an object remain straight in an image). To determine the magnitude of distortion, input (incident) rays forming a mirror symmetrical (along the x-axis and along the y-axis) checkerboard pattern are propagated through an optical system and deviations from the checkerboard input image reveal the extent of distortion within the optical system.

Pattern 580 recorded by the detector 558 shows that a width of the overall pattern along the x-direction is smaller for rays along the positive y-direction. There is also some curvature at the bottom (e.g., along the x-axis for smaller y coordinate values) of the checkerboard pattern. Distortion hinders an accurate image of the eye-box 553 from forming at the detector 558. In some embodiments, correction optical elements reduce (e.g., eliminate) distortion. In some embodiments, the distortion is first determined and subsequently used to calibrate the optical system. In some embodiments, correction algorithms process images detected at detector 558 to reduce (e.g., eliminate) distortion by computationally accounting for those errors.

FIG. 7A shows an optical system 700. Light bundles from an eye 702 impinge on a first optical element 704 disposed on a front surface of a waveguide 706. Rays guided within the waveguide 706 are shown in an "unfolded" configuration—total internal reflection of rays guided within the waveguide 706 is not depicted in FIG. 7A and the propagation distance of the rays within the waveguide sets the thickness of the waveguide 706. The guided rays are coupled out of the waveguide 706 by a second optical element 710. The inset at the top right hand corner shows an exploded view of the propagation of the guided rays near one end of the waveguide. A second optical element 710 corrects various aberrations of the rays, focusing the ray (e.g., separated by their wavelengths) near its output interface (e.g., as in a Keplerian telescope), and coupling the rays out to propagate along the z-axis. An imaging lens 712 images the rays onto a detector 714.

FIG. 7B depicts the optical system 700 of FIG. 7A in a folded configuration, showing multiple total internal reflections of the guide rays within the waveguide 706. The first optical element 704 couples in rays (from the eye 702) having a specific circular polarization into the waveguide 706. Rays that have a different circular polarization are either transmitted through the waveguide 706 or diffracted/refracted into a different direction compared to rays of the specific circular polarization. As a result, rays not having the specific circular polarization propagate away from the second optical element 710. The first optical element 704 is designed to respond to rays having a specific circular polarization. In some embodiments, the first optical element 704 is designed to diffract LCP rays into a +1 diffraction order and RCP rays into a −1 diffraction order. In some embodiments, the first optical element 704 is designed to diffract RCP rays into a +1 diffraction order and LCP rays into a −1 diffraction order. In some embodiments, the first optical element 704 is designed to diffract LCP rays into a +1 diffraction order and RCP rays are transmitted through the first optical element 704 (e.g., the first optical element 704 does not cause diffraction of RCP rays). In some embodiments, the first optical element 704 is designed to diffract RCP rays into a +1 diffraction order and LCP rays are transmitted through the first optical element 704 (e.g., the first optical element 704 does not cause diffraction of LCP rays).

The rays are coupled out of the waveguide 706 by a second optical element 710. In some cases, some rays 720 are not coupled out by the second optical element 710 in a direction toward imaging lens 712 and instead leak out of the waveguide 706 because they no longer meet the total internal reflection conditions after interacting with the second optical element 710. Rays directed to the lens 712 are imaged by the lens 712 onto an image plane on the detector 714. Some rays 722 continue to be totally internally reflected within the waveguide past the second optical element 710.

Figure 7C:
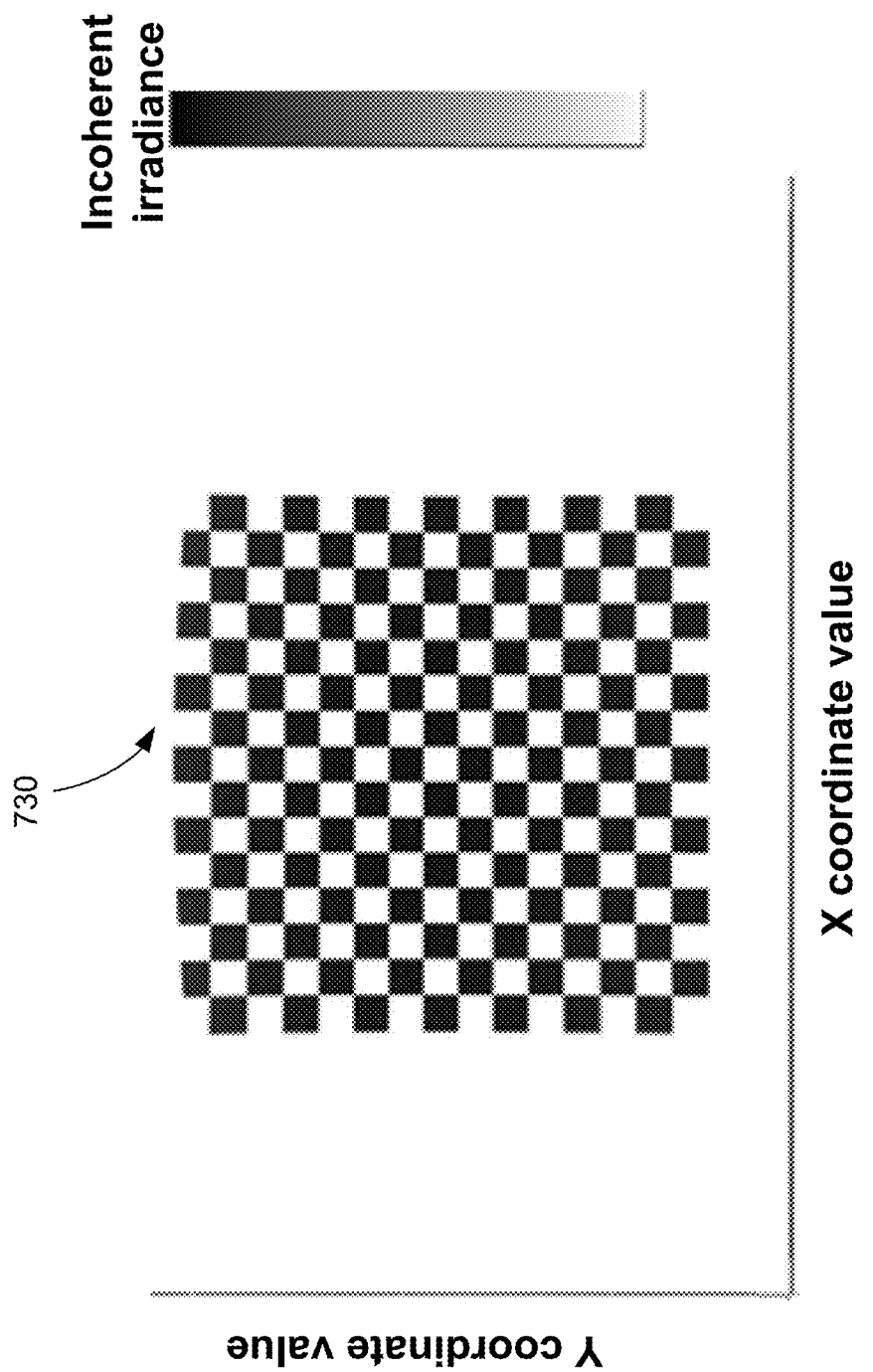
FIG. 7C is an example of distortion in an optical system.

FIG. 7C shows a pattern 730 that indicate the amount of distortion in the x-y plane. Input (incident) rays form a mirror symmetrical (along the x-axis and along the y-axis) checkerboard pattern and are sent through the optical system to determine the amount of deviation to the checkerboard pattern after emerging from the optical system. After the rays emerge from the optical system 700, widths of the overall pattern along the x-direction and y-direction remain substantially constant (e.g., vary by less than 10%, vary by less than 5%, vary by less than 1%). The pattern 730 shows some curvature at the top (i.e., along the x-axis for largest y coordinate values) of the checkerboard. In some embodiments, distortion hinders an accurate image of the eye-box 553 from forming at the detector 714. Here, the optical system 700 corrects for distortion, allowing the chief rays to be imaged with reduced distortion. In some embodiments, additional correction optical elements reduce (e.g., eliminate) distortion errors.

Besides the relay systems shown in FIGS. 5A, 5B, 5C, 5D, or in the relay systems shown in FIGS. 6A and 6B (e.g., Galilean telescopes and the Keplerian telescopes), other relays systems can be used. In some embodiments, the imaging systems contain a single relay system (e.g., FIGS. 5A-5D). In some embodiments, the imaging systems contain two relay systems (e.g., FIGS. 6A and 6B). In some embodiments, the optical waveguide along which rays of a specific circular polarization are guided can further include an intermediate field lens to reduce a magnification of light bundles (that include the first rays) coupled out of the waveguide. An intermediate field lens is a lens placed in a location that is conjugate with an image plane of the optical system (e.g., the plane of the detector).

Figures 8A, 8B:
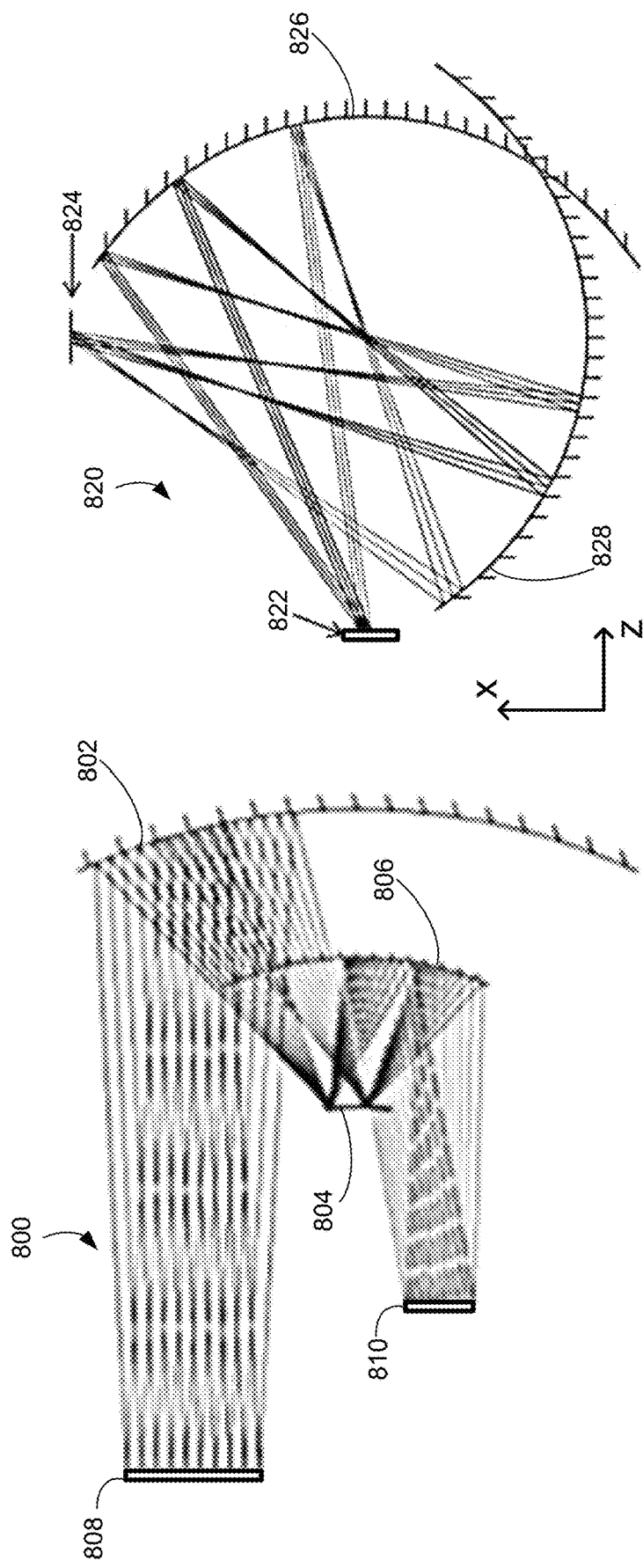
FIG. 8A shows an Offner relay optical system in accordance with some embodiments.
FIG. 8B shows a crossed elliptical relay optical system in accordance with some embodiments.

In some embodiments, the optical system includes an Offner telescope. FIG. 8A shows an Offner telescope 800 in some embodiments. The Offner telescope 800 includes three reflective surfaces, 802, 804, and 806. Light emerging from an object 808 is focused by the first reflective surface 802 onto the second reflective surface 804. Rays emerging at a first angle from the object 808 is focused onto a first location on the second reflective surface 804. Rays emerging at a second angle from the object 808 is focused onto a second location on the second reflective surface 804 different from the first.

The focused rays are reflected by the second reflective surface 804, diverge and are reflected off the third reflective surface 806. The third reflective surface 806 then images the light to an image plane 810.

In some embodiments, a center of curvature of the first reflective surface 802 and a center of curvature of the third reflective surface 806 coincide with the second reflective surface 804. In some embodiments, the optical system 800 provides a demagnification (i.e. the image 810 is smaller than the object 808). In some embodiments, the optical system 800 provides a magnification (i.e. the image 810 is larger than the object 808).

In some embodiments, the optical system 800 is configured as an afocal optical system. An afocal system (i.e., a system without focus) is an optical system that produces no net convergence or divergence of the beam (e.g., has an infinite effective focal length). An optical system that provides afocal magnification can also correct for Petzval field curvature. Such curvature happens when image points near the optical axis are in perfect focus but rays off axis come into focus before an image sensor. The optical system 800 corrects for Petzval field curvature because the curvature of the second reflective surface 804 is opposite in sign (e.g., a diverging, convex mirror) to the curvature of the first reflective surface 802 and third reflective surface 806 (e.g., converging, concave mirrors). Off-axis rays reflect off the edge of a convex mirror in an opposite way from that of a concave mirror, reducing (e.g., cancelling) the Petzval field curvature caused by the first and third reflective surfaces.

FIG. 8B shows an optical system 820 containing two crossed elliptical surfaces 826 and 828. Light emerging from an object 822 is reflected off the first elliptical reflective surface 826 before reflecting off a second elliptical reflective surface 828. The second elliptical reflective surface direct the rays onto an image plane 824, forming an image of the object 822 at the image plane 824.

In some embodiments, the first optical element (e.g., 404, 452, 504, 530, 554, 608, 652, 704) and the second optical element (e.g., 404, 556, 654, 710) form the elements of the Offner relay 800. In some embodiments, the first optical element (e.g., 404, 452, 504, 530, 554, 608, 652, 704) and the second optical element (e.g., 404, 556, 654, 710) form the elements of the crossed elliptical relay 820.

In some embodiments, the first optical element is made of a material that causes diffraction that is analogous to an optical reflective effect of the first reflective surface 802. In some embodiments, the second optical element is made of a material that causes diffraction that is analogous to an optical reflective effect of the third reflective surface 806. In such embodiments, the reflective surface 804 is provided by another optical element either within the waveguide or outside the waveguide.

In some embodiments, the Offner relay 800 is provided downstream of the waveguide. In some embodiments, the crossed elliptical relay 800 is provided downstream of the waveguide.

In some embodiments, the first optical element is made of a material that causes diffraction analogous to an optical reflective effect of the first elliptical reflective surface 826. In some embodiments, the second optical element is made of a material that causes diffraction analogous to an optical reflective effect of the second elliptical reflective surface 828.

In light of these principles, we now turn to certain embodiments.

In accordance with some embodiments, an optical system includes an optical waveguide, and a first optical element configured to i) direct a first ray, having a first circular polarization and impinging on the first optical element at a first incidence angle, in a first direction so that the first ray propagates through the optical waveguide via total internal reflection toward a second optical element. The first optical element is also configured to direct a second ray, having a second circular polarization that is distinct from the first circular polarization and impinging on the first optical element at the first incidence angle, in a second direction that is distinct from the first direction so that the second ray propagates away from the second optical element (e.g., the second ray does not propagate through the optical waveguide via total internal reflection and instead passes through the optical waveguide, or the second ray is directed away from the second optical element even if the second ray propagates through the optical waveguide via total internal reflection). The second optical element is configured to direct the first ray propagating through the optical waveguide toward a detector.

In some embodiments, directing a ray includes changing a direction of the ray (e.g., through reflection, refraction, and/or diffraction, etc.). In some embodiments, directing a ray includes not changing a direction of the ray (e.g., directing a ray includes allowing a ray to pass through an optical element without changing the direction of the ray).

In some embodiments, the first optical element comprises an element selected from the group consisting of: a polarization volume holographic element and a geometric phase lens. In some embodiments, the optical system includes a polarization volume holographic element (e.g., FIG. 10) and/or a geometric phase lens (e.g., FIG. 9). In some embodiments, the geometric phase lens is a decentered geometric phase lens.

In some embodiments, the first optical element is configured to direct a near-infrared light impinging on the first optical element at the first incidence angle in the first direction and direct a visible light impinging on the first optical element at the first incidence angle in a direction that is different from the first direction (e.g., allow the visible light to pass through the first optical element without changing the direction of the visible light). In some embodiments, the first ray has a wavelength greater than 850 nm. In some embodiments, the first optical element is configured to transmit a visible light (without changing the direction of the visible light). In some embodiments, the first optical element is configured to transmit a third ray having a wavelength shorter than 800 nm so that the third ray propagates away from the second optical element (e.g., the third ray does not propagate through the optical waveguide via total internal reflection and instead passes through the optical waveguide).

In some embodiments, the first optical element has a first diffraction efficiency for a near-infrared light and a second diffraction efficiency for a visible light, and the first diffraction efficiency is greater than the second diffraction efficiency (e.g., the first diffraction efficiency is 90% or greater and the second diffraction efficiency is 10% or less). In some embodiments, the first optical element has a diffraction efficiency for a wavelength greater than 850 nm that is higher than a diffraction efficiency for a wavelength shorter than 800 nm.

In some embodiments, the first optical element is disposed on a first surface of the optical waveguide so that the first ray impinges on the optical waveguide subsequent to impinging on the first optical element. In some embodiments, the first optical element is located between an object and the optical waveguide.

In some embodiments, the optical system includes the detector (e.g., FIGS. 5C and 5E). In some embodiments, the first ray impinging on the first optical element includes imaging light from an object, and the optical system is configured to project the imaging light onto the detector.

In some embodiments, the optical system further includes an imaging telescope that is distinct from a combination of the optical waveguide, the first optical element, and the second optical element. In some embodiments, the imaging telescope is configured to receive imaging light from the second optical element and form an image of the object on the detector. In some embodiments, the detector includes a camera. In some embodiments, the camera and the object are positioned on a same side of the optical waveguide. In some embodiments, the camera is positioned above the object. In some embodiments, the camera is positioned below the object. In some embodiments, the optical system is configured to reduce aberrations (e.g., chromatic aberrations, distortions, etc.) recorded by the detector (e.g., FIGS. 6A, 6B, 7A, 7B, and 7C).

In some embodiments, directing the first ray includes causing reflection and diffraction of the first ray. In some embodiments, the first optical element is disposed on a second surface of the optical waveguide so that the first ray impinges on the optical waveguide prior to impinging on the first optical element. In some embodiments, the optical waveguide receives the first ray on the first surface of the optical waveguide, and the first ray having passed through the first surface of the optical waveguide is reflected by the first optical element located on the second surface of the optical waveguide. In some embodiments, the optical waveguide is located between an object and the first optical element.

In some embodiments, the second optical element includes a polarization volume holographic element, a geometric phase lens (e.g., decentered geometric phase lens), an output mirror, and an output grating.

In some embodiments, the first ray forms a portion of a light bundle that is relayed to the second optical element at reduced magnification. In some embodiments, the optical waveguide further includes an intermediate field lens to reduce a magnification of the light bundle. In some embodiments, the intermediate field lens is disposed on a surface of the optical waveguide. In some embodiments, the intermediate field lens is embedded in the optical waveguide.

In some embodiments, the first optical element includes a coating that provides focusing power (e.g., the first optical element is a thin-film optics that has an optical power).

In some embodiments, the first optical element and the second optical element form an off-axis Galilean telescope (e.g., FIG. 6B). In some embodiments, the first optical element is a positive lens and the second optical element is a negative lens.

In some embodiments, the first optical element and the second optical element (collectively) form an Offner telescope (e.g., FIG. 8A). In some embodiments, the Offner telescope includes three reflective surfaces, the second reflective surface of the three reflective surfaces is positioned at an intermediate image plane of the optical system (e.g., FIG. 8A).

In some embodiments, the optical system includes an off-axis Galilean telescope (e.g., an off-axis Galilean telescope that is separate from the first optical element and the second optical element). In some embodiments, the off-axis Galilean telescope receives and image onto a detector light that exits from the optical waveguide (e.g., FIGS. 5C, 5D, and 5E). In some embodiments, the optical system further includes an optical relay system to image an output of the off-axis Galilean telescope onto the detector. In some embodiments, the off-axis Galilean telescope includes a converging lens and a diverging lens. The converging lens is decentered, and the diverging lens is decentered. The diverging lens is configured to reduce an aberration associated with the converging lens. In some embodiments, the aberration includes distortion. In some embodiments, the aberration includes chromatic aberration.

In some embodiments, the optical system includes a fourth optical element to correct distortion (e.g., FIGS. 7A, 7B, and 7C). In some embodiments, the fourth optical element includes a coating.

In some embodiments, the optical system further includes two off-axis reflective elliptical surfaces (e.g., FIG. 8B). In some embodiments, the first optical element includes one of the two off-axis reflective elliptical surfaces.

In accordance with some embodiments, an imaging system includes the optical system and a detector configured to receive an image of an object from the optical system.

In some embodiments, the object includes an eye, the detector includes a camera, the camera is positioned outside a field of view of the eye, and the first optical element is positioned in front of the eye so as to allow the camera to image a direct view of the eye.

In some embodiments, the imaging system is included in a headset (e.g., the imaging system operates as part of an eye-tracking unit of the headset).

In accordance with some embodiments, a method for relaying an image of an eye includes receiving, at a first optical element, light from an eye of a user. The first optical element is configured to direct a first ray, having a first circular polarization and impinging on the first optical element at a first incidence angle, in a first direction so that the first ray propagates through the optical waveguide via total internal reflection toward a second optical element. The first optical element is also configured to direct a second ray, having a second circular polarization that is distinct from the first circular polarization and impinging on the first optical element at the first incidence angle, in a second direction that is distinct from the first direction so that the second ray propagates away from the second optical element. The method includes directing, with a second optical element, the first ray out of the optical waveguide toward a detector.

In some embodiments, the method further includes projecting the first ray onto the detector to form an image; and determining, from the image, a position of a pupil of the eye of the user. In some embodiments, imaging the first ray onto the camera includes sending the first ray coupled out from the waveguide into an optical relay system, and the camera is positioned at an image plane of the optical system (e.g., FIGS. 5A and 5B). In some embodiments, the optical relay system includes an off-axis Galilean telescope, an off-axis Keplerian telescope, an Offner telescope, and/or two off-axis elliptical surfaces.

Although various drawings illustrate operations of particular components or particular groups of components with respect to one eye, a person having ordinary skill in the art would understand that analogous operations can be performed with respect to the other eye or both eyes. For brevity, such details are not repeated herein.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. An optical system, comprising:
    an optical waveguide;
    a first optical element configured to direct a first ray, from an eye, having a first circular polarization and impinging on the first optical element in a first direction to a second direction and direct a second ray, from the eye, having a second circular polarization that is distinct from the first circular polarization and impinging on the first optical element in the first direction to a third direction distinct from the second direction so that one of the first ray or the second ray propagates through the optical waveguide via total internal reflection and the other of the first ray or the second ray is transmitted through the optical waveguide; and
    a second optical element positioned to steer a ray propagating through the optical waveguide for exiting from the optical waveguide.

2. The optical system of claim 1, wherein the first optical element comprises an element selected from the group consisting of a polarization volume holographic element, and a geometric phase lens.

3. The optical system of claim 1, wherein the first ray has a wavelength greater than 850 nm.

4. The optical system of claim 3, wherein the first optical element is configured to transmit a third ray having a wavelength shorter than 800 nm so that the third ray propagates away from the second optical element.

5. The optical system of claim 1, wherein the first optical element is disposed on a first surface of the optical waveguide so that the first ray impinges on the optical waveguide subsequent to impinging on the first optical element.

6. The optical system of claim 1, further comprising a detector, wherein the first ray impinging on the first optical element comprises imaging light from an object, and the optical system is configured to project the imaging light onto the detector.

7. The optical system of claim 1, wherein directing the first ray comprises causing reflection and diffraction of the first ray.

8. The optical system of claim 7, wherein the first optical element is disposed on a second surface of the optical waveguide so that the first ray impinges on the optical waveguide prior to impinging on the first optical element.

9. The optical system of claim 1, wherein the second optical element comprises an element selected from the group consisting of a polarization volume holographic element, a geometric phase lens, an output mirror, and an output grating.

10. The optical system of claim 1, wherein the first ray forms a portion of a light bundle that is relayed to the second optical element at reduced magnification.

11. The optical system of claim 10, wherein the optical waveguide further comprises an intermediate field lens to reduce a magnification of the light bundle.

12. The optical system of claim 1, wherein the first optical element further comprises a coating that provides focusing power.

13. The optical system of claim 1, wherein the first optical element and the second optical element form an off-axis Galilean telescope.

14. The optical system of claim 1, wherein the first optical element and the second optical element form an Offner telescope.

15. The optical system of claim 14, wherein the Offner telescope comprises three reflective surfaces, the second of the three reflective being positioned at an intermediate image plane of the optical system.

16. An imaging system, comprising:
the optical system of claim 1; and
a detector configured to receive an image of an object from the optical system.

17. The imaging system of claim 16, wherein the object comprises an eye, the detector comprises a camera, the camera is positioned outside a field of view of the eye, and the first optical element is positioned in front of the eye so as to allow the camera to image a direct view of the eye.

18. The imaging system of claim 16, wherein the imaging system is included in a headset.

19. A method for relaying an image of an eye of a user, the method comprising:
receiving, at a first optical element, a first ray, from an eye, having a first circular polarization and impinging on the first optical element in a first direction and directing the first ray to a second direction;
receiving, at the first optical element, a second ray, from the eye, having a second circular polarization that is distinct from the first circular polarization and impinging on the first optical element in the first direction and directing the second ray to a third direction distinct from the second direction so that one of the first ray or the second ray propagates through an optical waveguide via total internal reflection and the other of the first ray or the second ray is transmitted through the optical waveguide; and
steering, with a second optical element, a ray propagating through the optical waveguide for exiting from the optical waveguide.

20. The method of claim 19, further comprising:
projecting the steered ray onto a detector to form an image; and
determining, from the image, a position of a pupil of the eye of the user.

* * * * *